United States Patent
Morse

[11] 3,903,765
[45] Sept. 9, 1975

[54] SIMPLIFIED LATHE

[76] Inventor: Glenn B. Morse, 321 Fountain St. NE. Apt. No. 1, Grand Rapids, Mich. 49502

[22] Filed: Sept. 14, 1973

[21] Appl. No.: 397,396

[52] U.S. Cl. .................... 82/21 R; 82/27
[51] Int. Cl. ............................ B23b 21/00
[58] Field of Search .......... 82/21 R, 27, 28, 22, 29, 82/6 R, 6 A

[56] References Cited
UNITED STATES PATENTS

| 317,449 | 5/1885 | Flather | 82/21 X |
| 590,736 | 9/1897 | Earle | 82/21 R |
| 617,567 | 11/1899 | Flather | 82/28 |
| 1,222,934 | 4/1917 | Cormier | 82/28 |
| 2,416,612 | 2/1947 | Cavanagh | 82/21 R X |

Primary Examiner—J. M. Meister
Assistant Examiner—W. R. Briggs
Attorney, Agent, or Firm—Glenn B. Morse

[57] ABSTRACT

A lathe is designed to accommodate a variety of machining operations, and provide automatic feed and accuracy of alignment at a minimum of cost. The preferred form of the machine is adapted to function either as bench lathe with its own speed-reducer, or in conjunction with a base machine providing support and power at variable rotational speeds.

6 Claims, 25 Drawing Figures

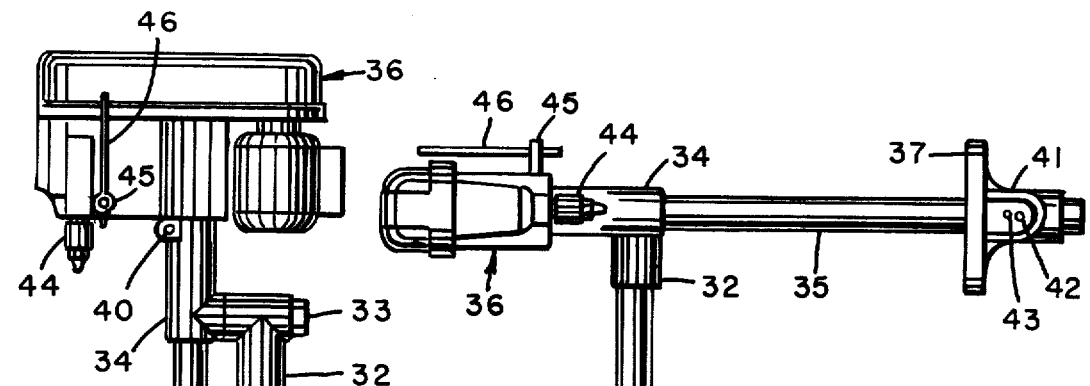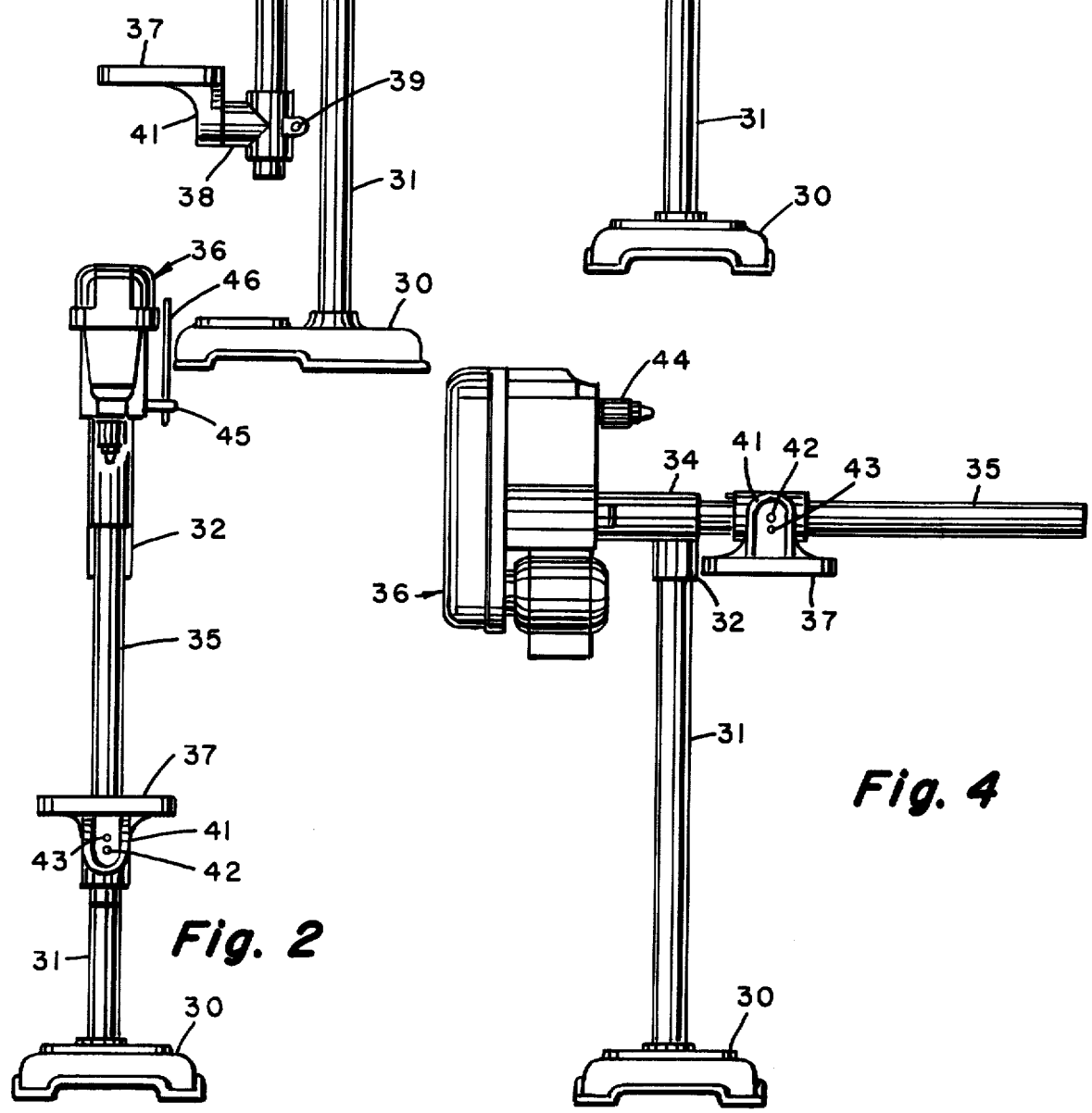

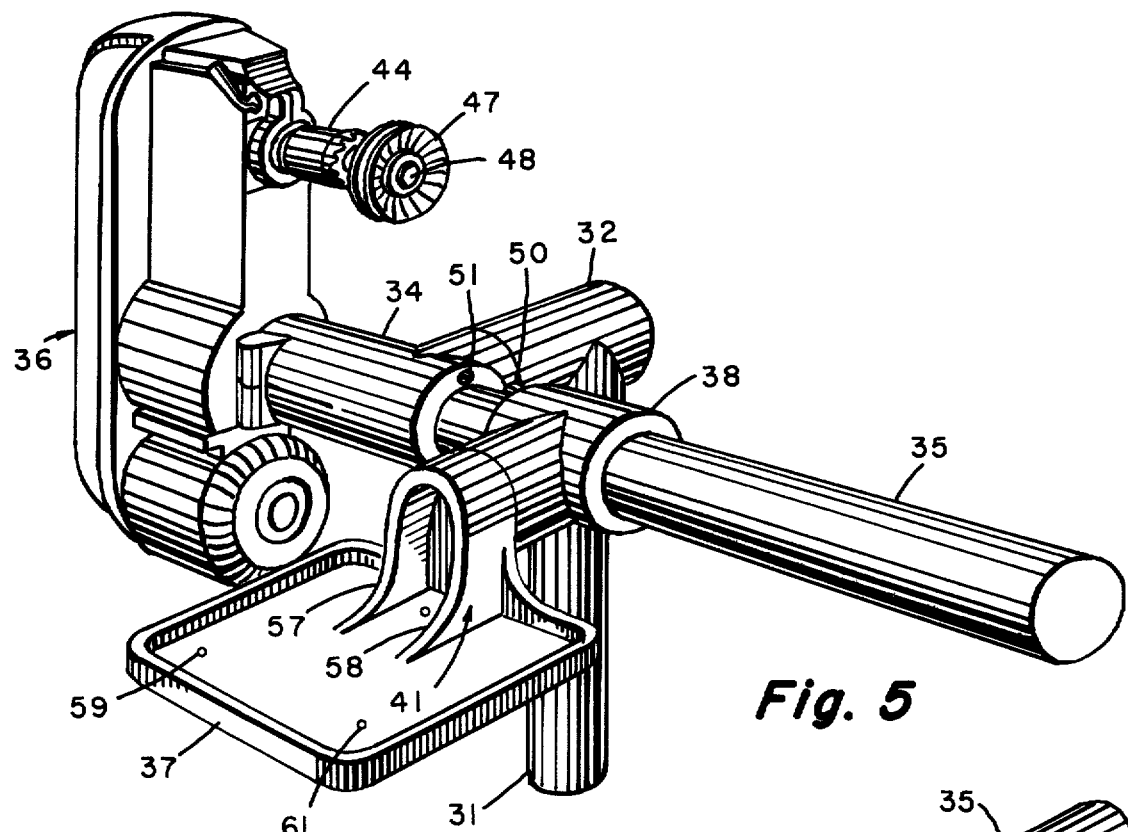
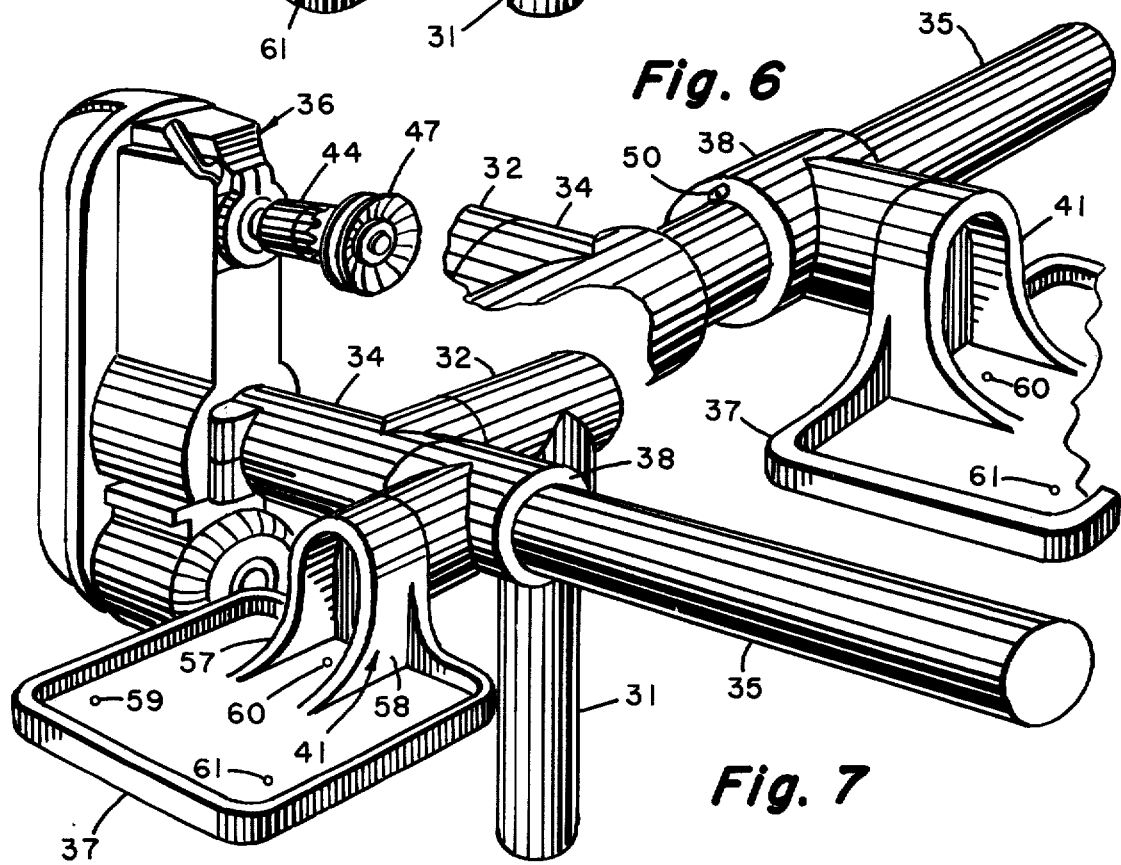

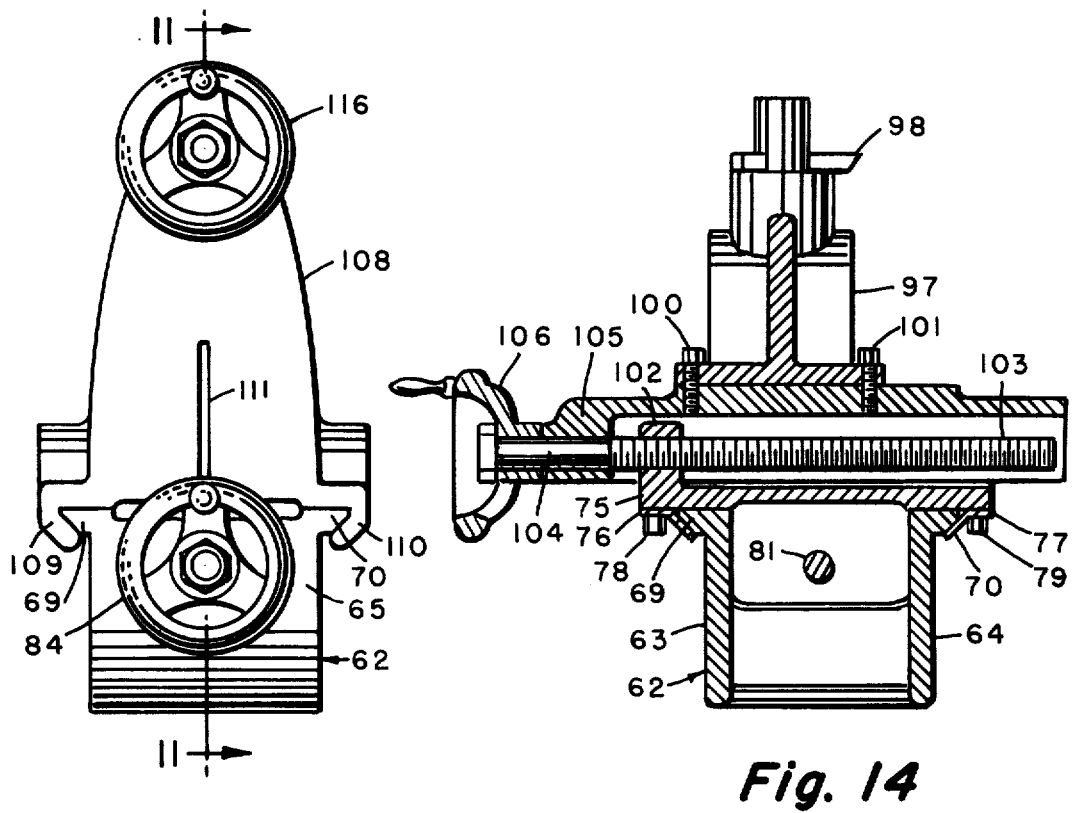
Fig. 12
Fig. 14
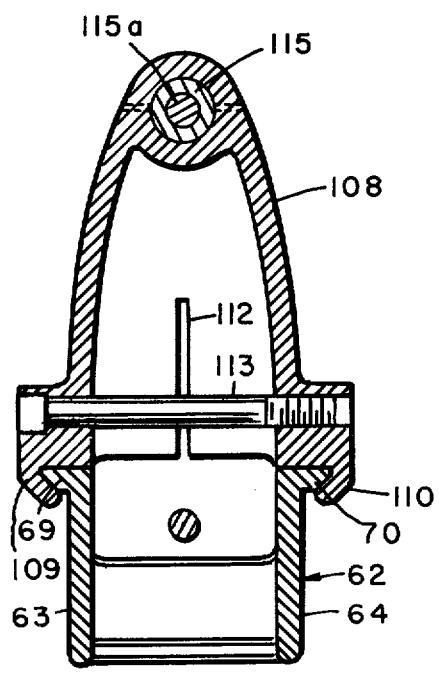
Fig. 13
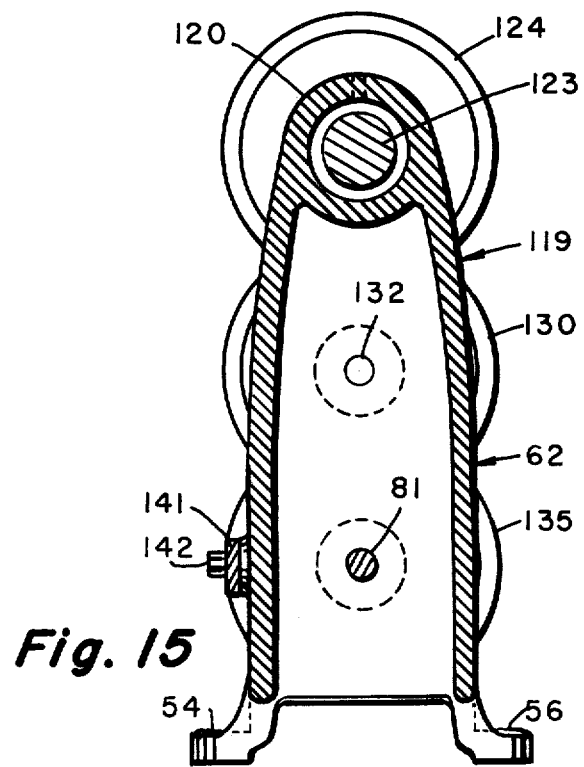
Fig. 15

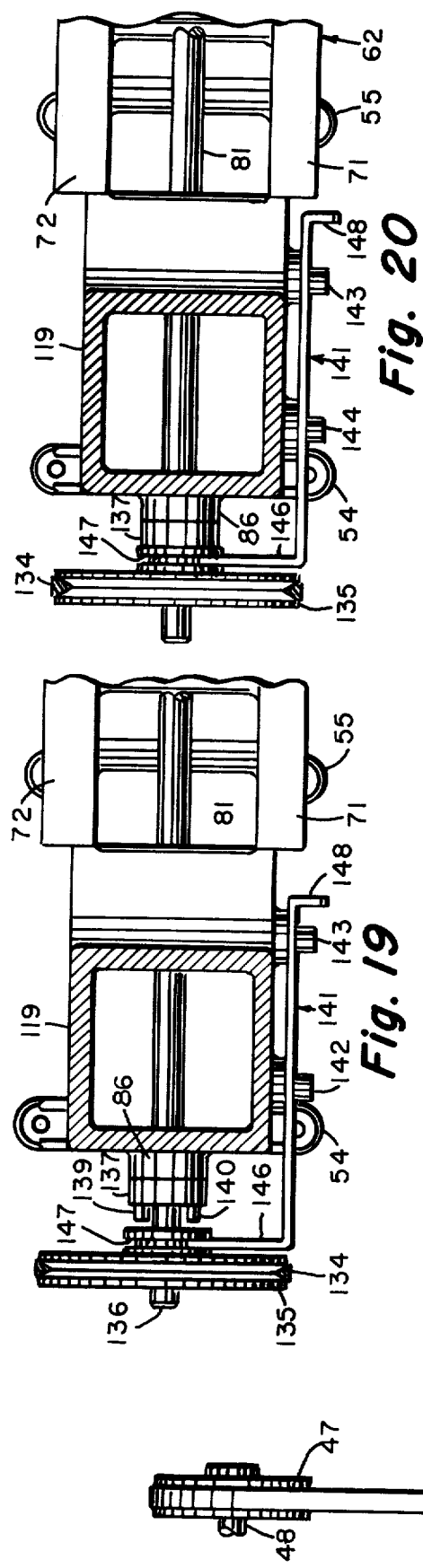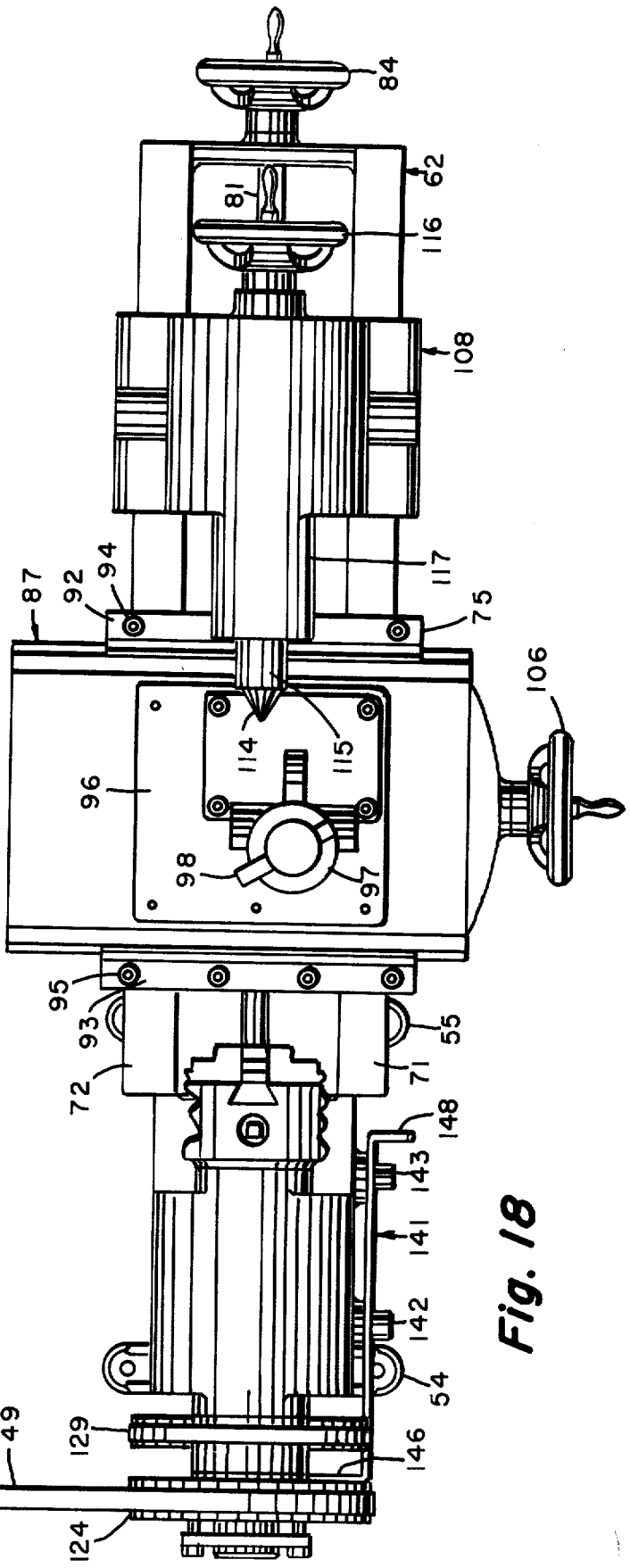

3,903,765

SIMPLIFIED LATHE

BACKGROUND OF THE INVENTION

A lathe is essentially a machine for rotating a workpiece against a cutting tool. It usually consists of a spindle rotatably mounted in a frame, with the spindle carrying a chuck or some other form of holding device. The frame provides a guideway parallel to the axis of rotation of of the spindle, and a carriage supporting the cutting tool moves along the guideway under the action of a feed screw. A tail stock for supporting the workpiece at a distance from the spindle chuck is usually included in the assembly, although short pieces can be held in cantilever fashion by the chuck. The latter arrangement is common in very small lathes of the sort used by jewelers, and the operation of the feed on such a machine is usually by manual rotation of a wheel or crank. In larger lathes, particularly where longer workpieces are to be expected, the feed screw is rotated by a power take-off related to the rotation of the main spindle. In almost all cases, the feed screw is axially fixed with respect to the frame, and has threaded engagement with a member fixed with respect to the carriage. Feed movement is generated in some machines by power delivered directly to the carriage, and adapted to operate a gearing system interengaged with a rack fixed with respect to the frame of the machine.

Lathes are normally either completely self-powered, or are equipped to receive power from a motor mounted adjacent to the machine. The self-powered machines normally contain their own speed-control, which is essentially a power-transfer system functioning as a speed reducer. Where the motor is separately mounted (a common practice in bench lathes), it is frequently necessary to use an idler shaft carrying a set of sheaves for establishing the necessary speed reductions. Step-cone pulleys on the motor, the idler shaft, and on the lathe accept belts in various positions to establish the necessary relative rotational speeds. Where the lathe is adapted to function as attachment to an existing machine carrying its own speed-reduction system, the drive from the base machine to the lathe can operate without auxillary speed-control equipment.

SUMMARY OF THE INVENTION

The feed screw of the machine is centrally mounted within the frame providing the guideway, and at a position mid-way between the rails forming the guideway. Feed screw forces on the carriage are thus balanced so that operation of the feed system does not tend to induce a rotation of the carriage about a vertical axis. An extension of the feed screw proceeds through the end of the machine to a point where it is rotated by a belt-operated transmission system including a clutch adapted to engage and disengage the system from the feed screw. The tail stock is accurately aligned with respect to the path of movement of the carriage and the axis of rotation of the spindle by the generation of a clamping action directly against the surfaces of the guideway responsible for the alignment of the components of the machine.

A pivoted idler arm is provided for carrying the idler shaft functioning as a speed reducer when the machine is to be installed as a separately-powered bench lathe. The position of the fulcrum mounting of the idler arms is such as to facilitate belt adjustment and replacement, and control belt tension.

DESCRIPTION OF THE DRAWINGS

FIGS. 1 through 4 illustrate various positions of a base machine on which one form of the invention is mounted as an attachment.

FIG. 5 is a perspective view of the base machine in a position for supporting the lathe attachment, but prior to the interengagement of a safety coupling system.

FIG. 6 is a perspective view from the opposite direction of that of FIG. 5, showing the coupling member.

FIG. 7 illustrates the machine in the position to receive the lathe attachment, with the safety coupling interengaged.

FIG. 12 is an end view at the right end of the machine as shown in FIG. 10.

FIG. 13 is a section on the plane 13—13 of FIG. 10.

FIG. 14 is a section on the plane 14—14 of FIG. 10.

FIG. 15 is a section on the plane 15—15 of FIG. 10.

FIG. 18 is a top view of the lathe assembly.

FIG. 19 is a section on the plane 19—19 of FIG. 10.

FIG. 20 is a section on the plane 20—20 of FIG. 16.

DESCRIPTION OF THE PREFERRED EMBODIMENTS

Figure 8:
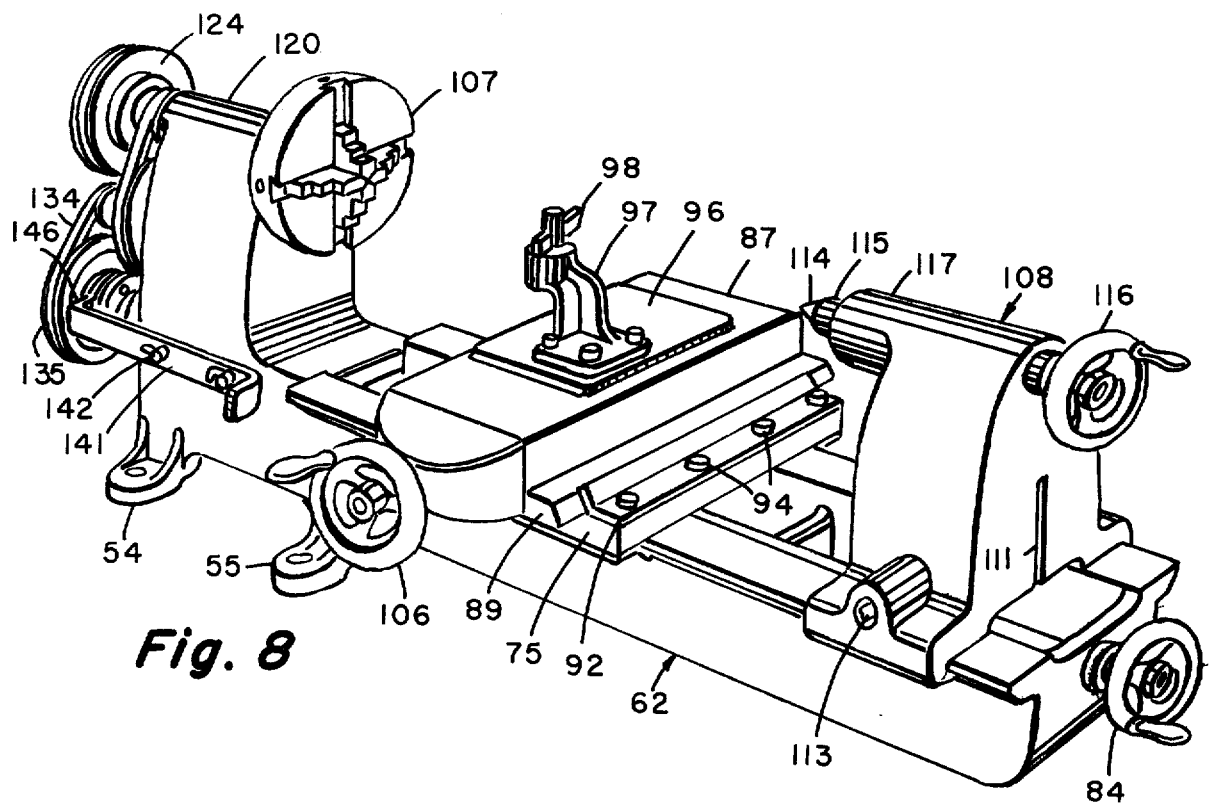
FIG. 8 is a perspective view of the lathe attachment apart from the base machine.

A machine of the type shown in FIGS. 1 through 4 is described and claimed in U.S. Pat. No. 2,963,057. The principal components of such a machine include a base 30, a fixed column 31 carrying a fulcrum member 32 rotatably supporting a shaft assembly 33 secured to the column clamp 34, a front column 35 supporting the powerhead 36, and the table 37 secured to the bracket 38 engaging the front column 35. A clamping bolt 39 constricts the bracket 38 about the front column 35 to secure the position of the table, and the clamping bolt 40 constricts the clamp 34 about the column 35 to secure the column against rotation about its own axis. The powerhead 36 is normally fixed with respect to the front column 35. The table 37 has a downwardly-extending arm 41 at its rear, and a bolt 42 establishes a pivotal connection between the table 37 and the bracket 38. The locking bolt 43 also engages the bracket 38 at a point eccentric to the bolt 42 to secure the table at predetermined angular positions of adjustment. The powerhead 36 is practically identical to that of a standard drill press. The chuck 44 normally receives rotary cutting tools. In the present application, however, this chuck serves a point of attachment for a power-transmission sheave. The feed shaft 45 is also conventional drill press equipment, and rotation of this shaft by the handle 46 will induce downward movement of the quill assembly carrying the chuck 44 along with the spindle on which it is mounted. This entire powerhead assembly may be considered as conventional. The machine initially in the position shown in FIG. 1 is prepared for receiving the lathe attachment by a series of adjustments, the first of these appearing in FIG. 3. The FIG. 3 position is obtained merely by rotating the front column about the axis of the shaft assembly 33. The next step in the procedure is the rotation of the front column 35 about its own axis carrying with it the powerhead 36, the table 37, and the table bracket 38. This rotation to the FIG. 4 position involves an upward and rearward movement of the front portion of the powerhead, from the FIG. 3 position. After this is obtained, the table is then back-rotated by first loosening the clamping bolt 39, and then moving the table axially to the FIG. 4 position as it is rotated into a horizontal plane. Table 37 is also rotated about the axis of the bolt 42 into a position where it is inverted with respect to the position shown in FIG. 2. FIG. 5 corresponds to the position shown in FIG. 4, with the addition of the driving sheave 47 mounted on the short shaft 48 held in the chuck 44.

Figure 9:
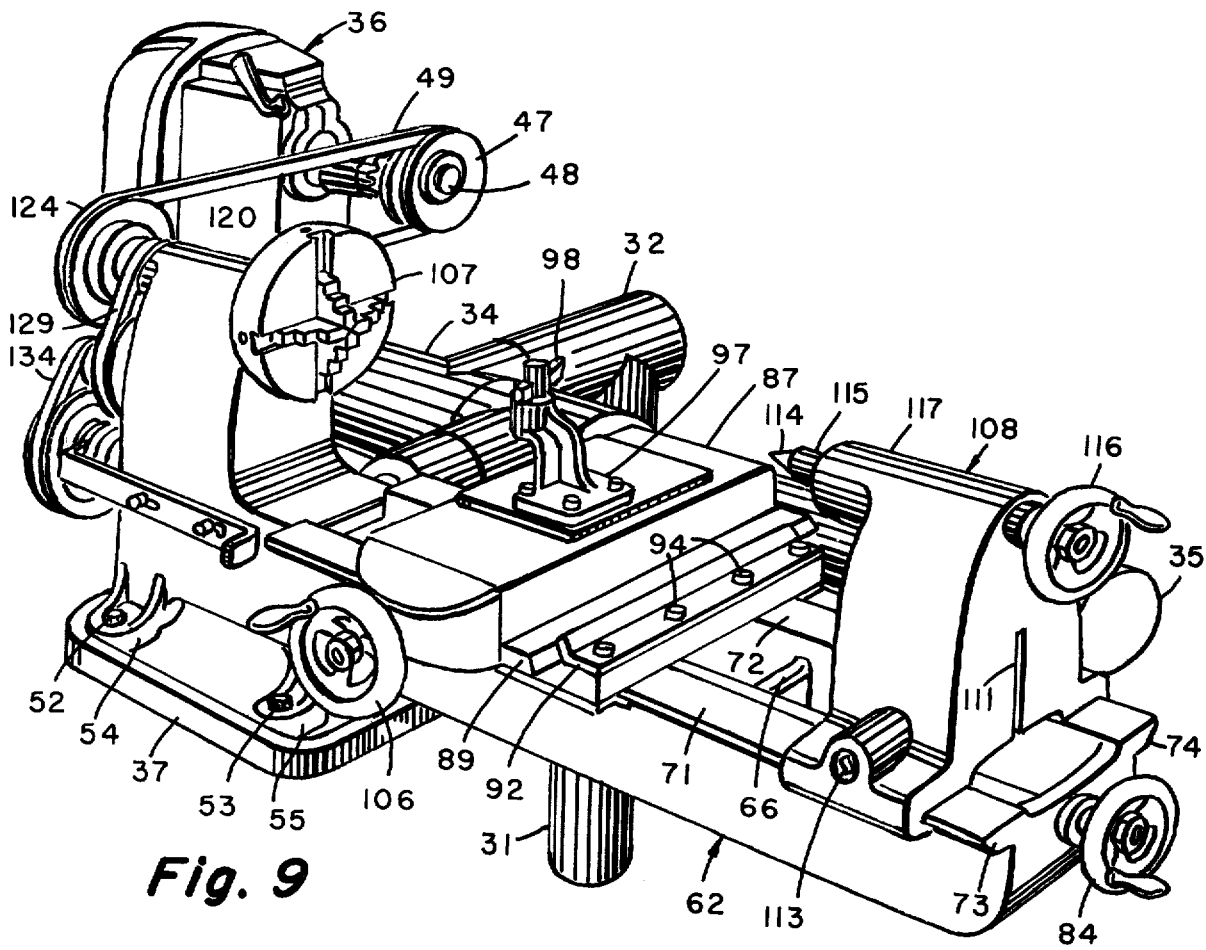
FIG. 9 shows the lathe attachment of FIG. 8 secured to the base machine, and in operating condition.

One of the desireable features of the machine shown in FIGS. 1 through 4 is the rotatability of the powerhead 36 about the axis of the front column 35, which is obtained by rotation of the column with the clamp 34. This freedom of adjustment is utilized to provide for adjustment of belt tension, and for the installation and removal of belts engaged with the sheave 47. Adjustment of the handle 46 will also position the chuck 44 axially so that the sheave is properly aligned for co-planar operation of the belt 49 shown in FIG. 9. Any such adjustment must, however, involve a relative angular movement about the axis of the column 35 between the table 37 and the powerhead 36. Such an adjustment is difficult to accomplish without the engagement of the coupling pin 50 in the bracket 38 with the socket 51 in the clamp 34. (Refer to FIGS. 5 and 6.) It is obvious that once this interengagement takes place, the table 37 is locked with respect to rotation about the axis of the column 35. With the clamping bolts 39 and 40 loosened, it is then possible to rotate the powerhead 36 (with the column 35) without disturbing the horizontal position of the table 37. This feature is described and claimed in my co-pending application Ser. No. 284,417, filed on Aug. 28, 1972. The interengagement of the coupling places the machine in the condition shown in FIG. 7.

The lathe attachment shown in FIG. 8 is secured to the table 37 by bolts as shown at 52 and 53 interengaging the table with the legs 54 and 55, respectively. A leg 56 on the opposite side of the machine is received between the flanges 57 and 58 of the table to function as a preliminary locating arrangement to facilitate the insertion of the mounting bolts in the threaded holes 59–61 in the table. Where this locating feature is not desired, the four-legged arrangement in FIGS. 11, 18, 19, and 20 may be used. The legs 54–56 are integral with the one-piece frame 62. As viewed in FIG. 10, approximately the right-hand three quarters of the frame is formed by the spaced walls 63 and 64 (refer to FIGS. 13 and 14) interconnected by the end wall 65 and the traverse members 66–68. Openings are left in the bottom of the frame between these members for chips and foreign matter to escape. The tops of the walls 63 and 64 are turned outwardly to form flanges 69 and 70. The top surfaces 71 and 72 of these flanges are co-planar, and the edge surfaces 73 and 74 are disposed at an angle of 45 degrees to the top surfaces 71 and 72. Referring to FIG. 14, the carriage 75 rests on the surfaces 71 and 72, and the retaining strips 76 and 77 are secured to the carriage 75 by bolts as shown at 78 and 79, respectively. The retainer strips are formed to bear evenly against the edge guideway surfaces 73 and 74, preferably with light resilient pressure. Referring to FIG. 11, the carriage 75 has a lug 80 extending downward, and having a threaded hole engaging the feed screw 81. This feed screw has a journal section 82 rotatably received in a bearing boss 83 in the end wall 65 of the frame, and a hand wheel 84 has its hub 85 secured to the feed screw journal 82 by any convenient means. The opposite end of the feed screw is rotatably received in the bearing boss 86 of the frame, and it will be noted that the bearing engagement at this point is at a diameter sufficiently large to admit the threaded portion of the feed screw so that this component can be inserted into the frame from the left, rotated into threaded engagement with the lug 80, and continued on to the point of engagement of the journal 82 with the bearing boss 83.

Referring to FIG. 11, the cross-slide 87 has the opposite bearing flanges 88 and 89 resting in sliding engagement on supporting surfaces at the correspondingly opposite sides of the carriage 75. The flanges 88 and 89 have edges disposed and planes at an angle of 45 degrees to the plane of the supporting surfaces 90 and 91 of the carriage. The angular retaining strips 92 and 93 are secured to the carriage 75 with screws as shown at 94 and 95, with the free edges of the strips bearing uniformly along the inclined edges of the flanges 88 and 89. These strips are similar in function to the retaining strips 76 and 77 shown in FIG. 14, and it is preferable that a resilient pressure be maintained by the strips against the inclined flange edges. In the cases of both sets of strips, it is also preferable that the location of the holes in the strips receiving the screws shall be positioned such that the degree of tightening of the screws will control the degree of pressure of the strips against the flange edges. The top surface 96 of the cross-slide is available as a support for a variety of components, such as the offset tool post 97 (refer to FIG. 10) supporting the tool bit 98. The tool post is removably secured to the cross-slide by screws as shown at 99–101.

The carriage 75 has a central lug 102 in threaded engagement with the cross-feed screw 103 (refer to FIG. 14). A journal extension 104 of the feed screw extends through the bearing boss 105 of the cross-slide to a point of connection with the hand wheel 106. The journal extension 104 is fixed with respect to the hand wheel by any convenient standard arrangement. Rotation of the hand wheel in either direction will obviously induce transverse movement of the cross-slide with respect to the guideway, and will control the distance between the axis of rotation of the chuck 107 and the tool bit 98, thus controlling the turning diameter effective on the workpieces.

The tail stock generally indicated at 108 has the opposite portions 109 and 110 respectively embracing the guideway flanges 69 and 70 in closely-fitting relationship. This fit is preferably a close sliding interengagement. The alignment of the tail stock 108 with respect to the axis of rotation of the chuck is obtained after selecting the position of the tail stock along the guideway by converting this sliding fit to a positive clamping action. This is possible as a result of the slots 111 and 112 separating the right and left-hand portions of the tail stock (as viewed in FIG. 10) so that the tightening of the clamping bolt 113 will bring the opposite sides of the tail stock closer together, and thus generate the gripping action. Since the relative position of the horizontal and inclined mating surfaces between the guideways and the tail stock is not disturbed by the clamping action, the surfaces are merely forced into more solid engagement without creating a tendency to push the tail stock one way or the other. The usual tailstock clamping system normally exerts a braking pressure against one surface exclusively. The alignment function serves to position the upper portion of the tailstock accurately, so that the center 114 carried by the tail stock spindle 115 is maintained as closely as possible to the axis of rotation of the chuck 107, while being adjusted axially by the hand wheel 116 within the bearing section 117. This portion of the tail stock slideably receives the spindle 115, either in a close slip fit, or with a degree of resilient pressure made possible by the presence of the slot 118. A clamping bolt may be incorporated at the left extremity of the portion 117 to constrict it about the spindle 115, if desired. Movement of the spindle is induced by the rotation of the screw 115a (in threaded engagement with the spindle 115) by the hand wheel 116.

Figure 10:
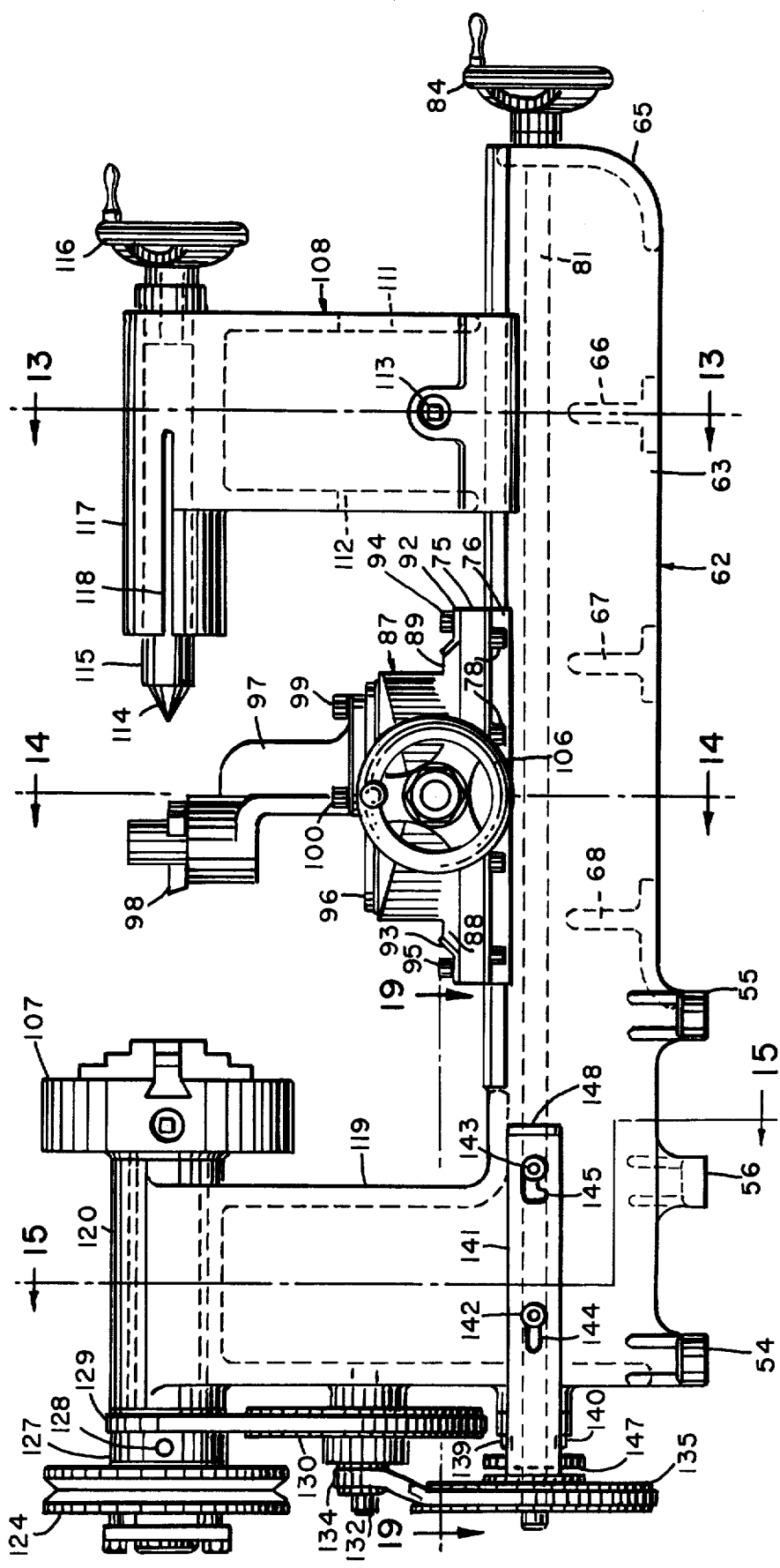
FIG. 10 is a side elevation of a lathe attachment, on an enlarged scale.
Figure 11:
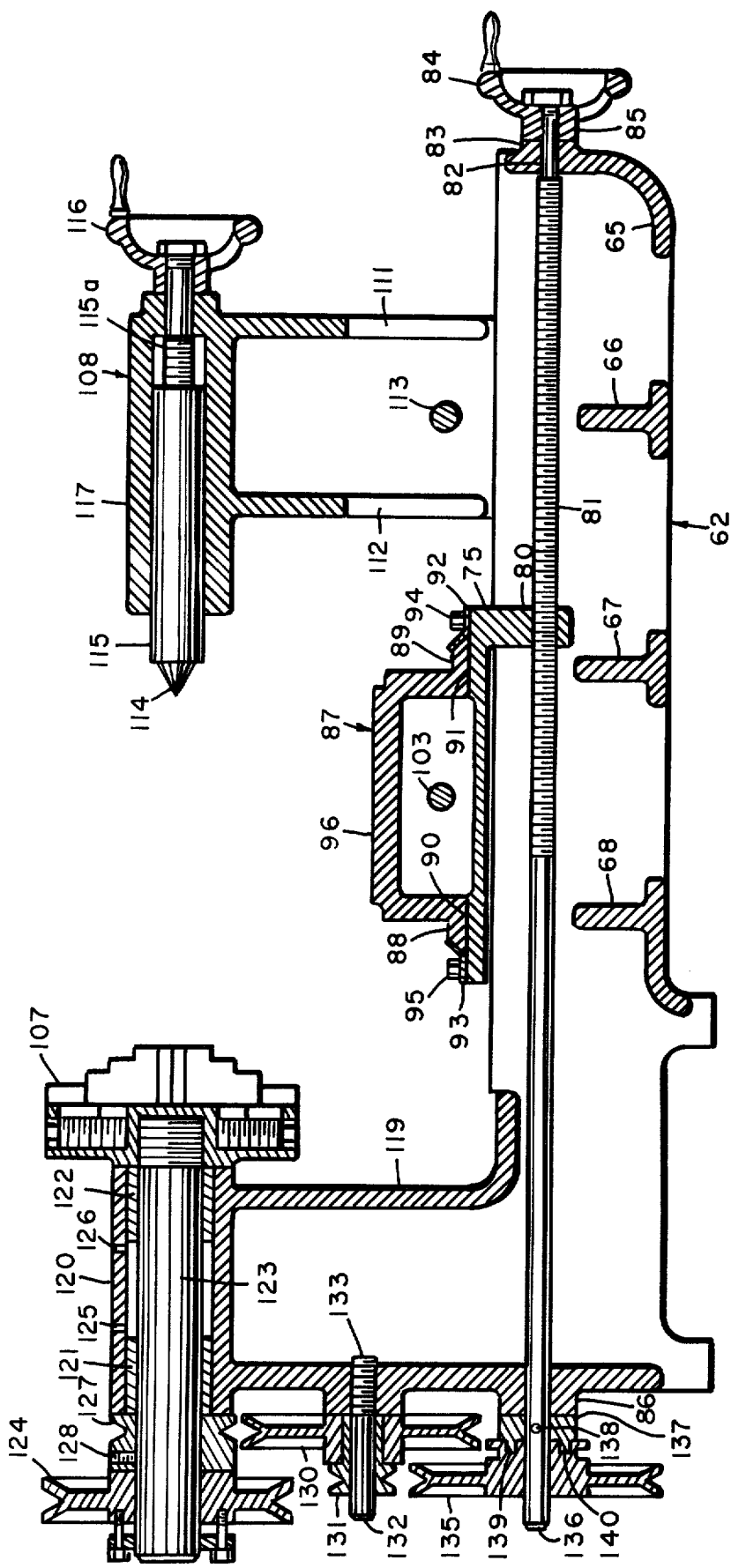
FIG. 11 is a section on a plane 11—11 of FIG. 12.
Figure 16:
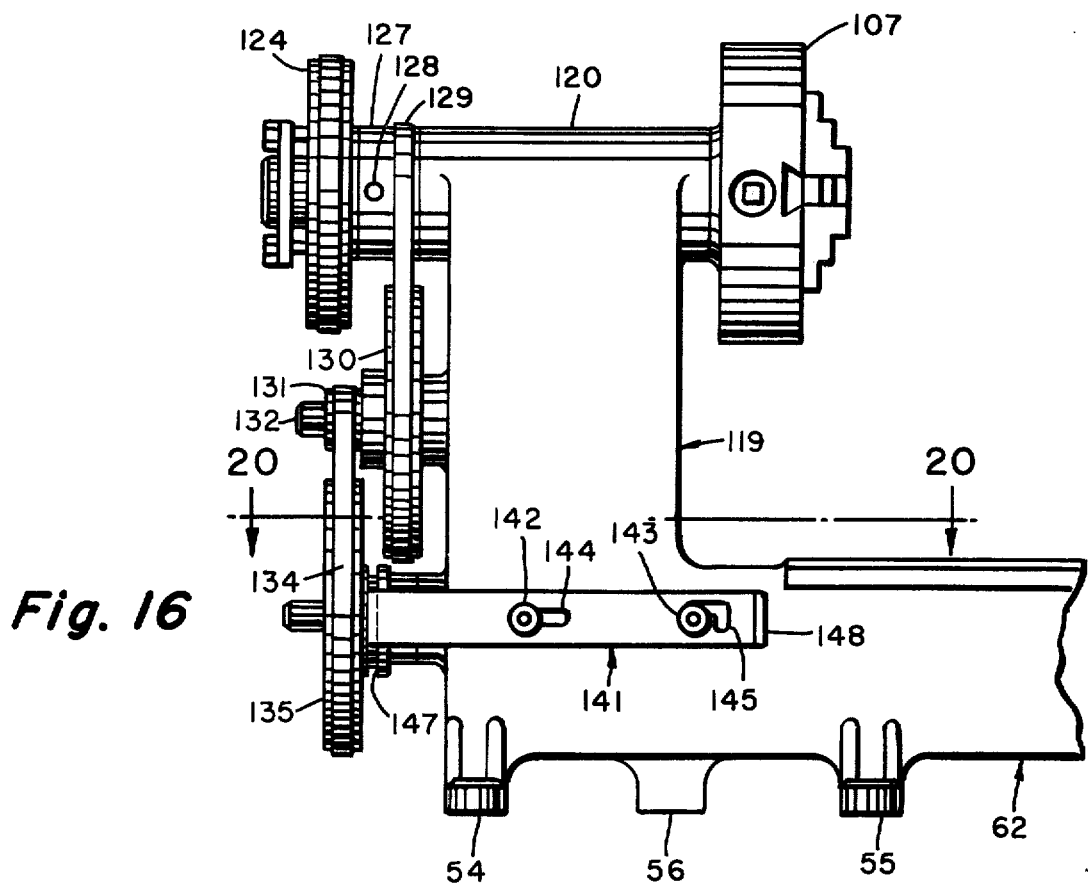
FIG. 16 is a fragmentary front elevation at the spindle end of the machine.
Figure 17:
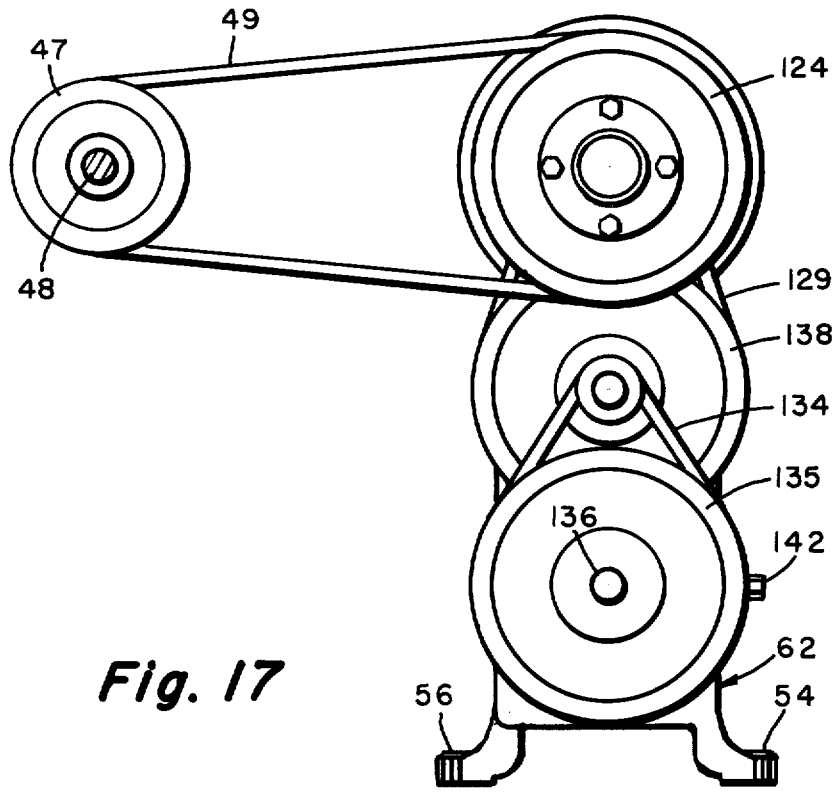
FIG. 17 is an end view of the structure shown in FIG. 16.
Figure 21:
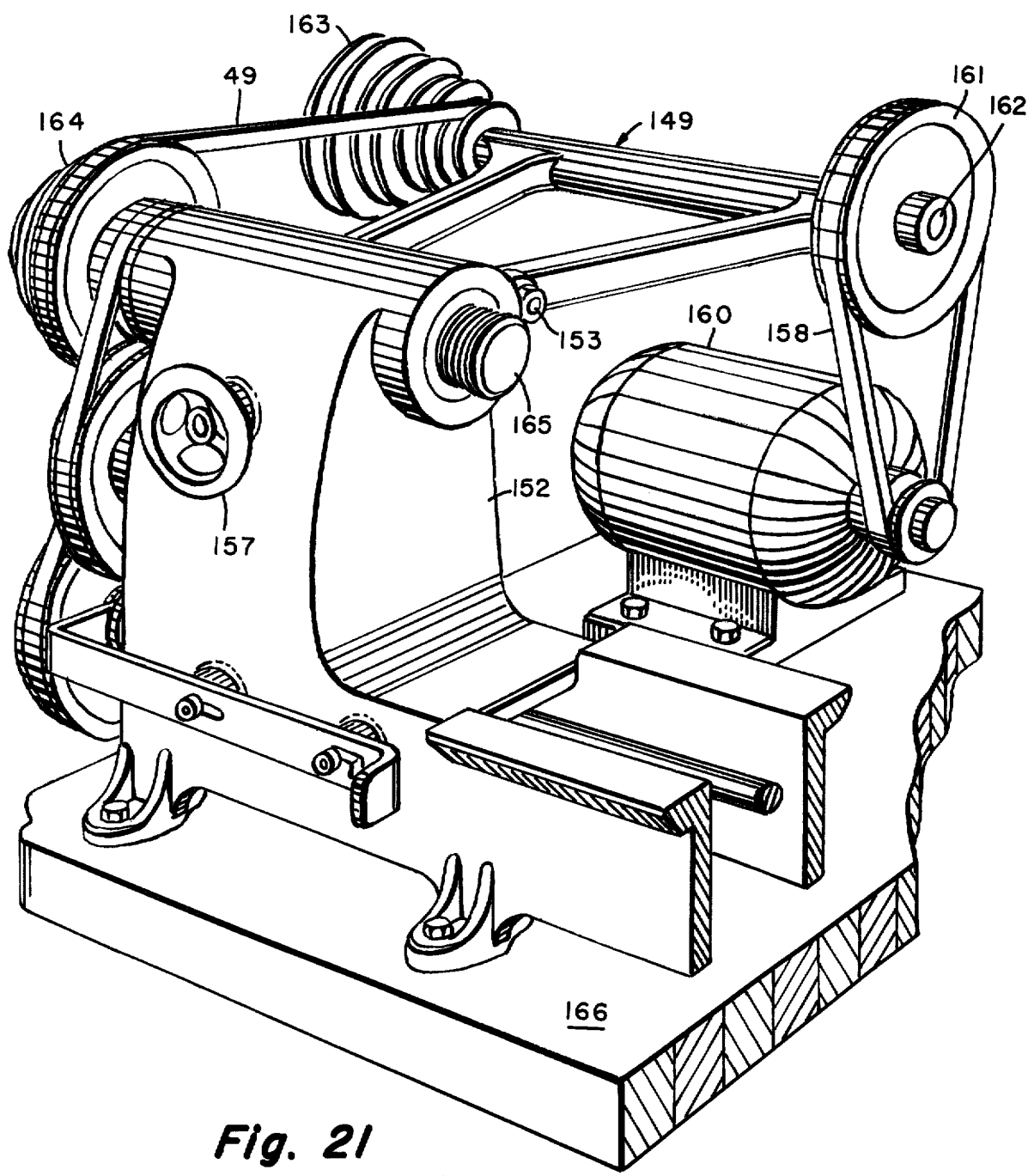
FIG. 21 is a fragmentary perspective view on an enlarged scale of a modified form of the invention adapted to operate as a bench lathe.
Figure 22:
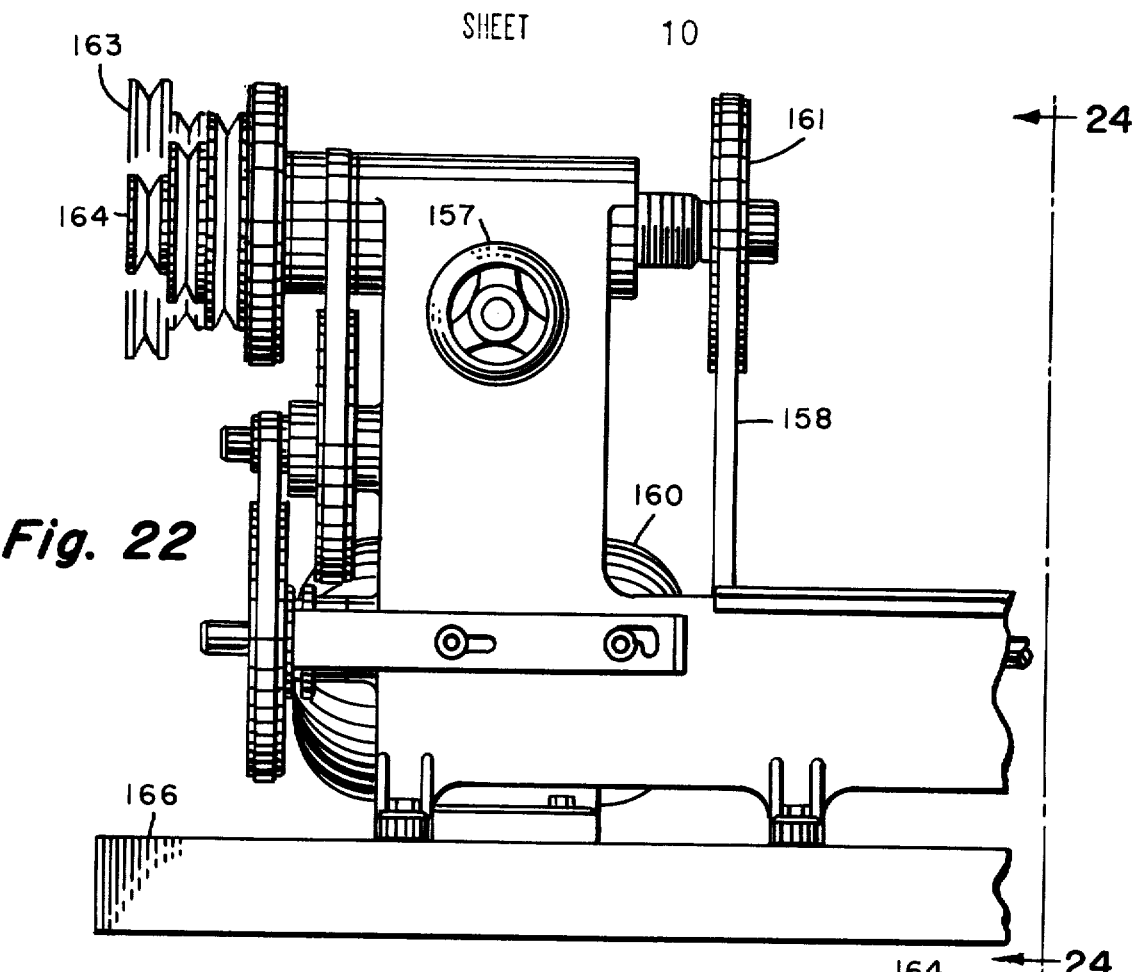
FIG. 22 is a fragmentary front elevation at the spindle end of the machine illustrated in FIG. 21.
Figure 23:
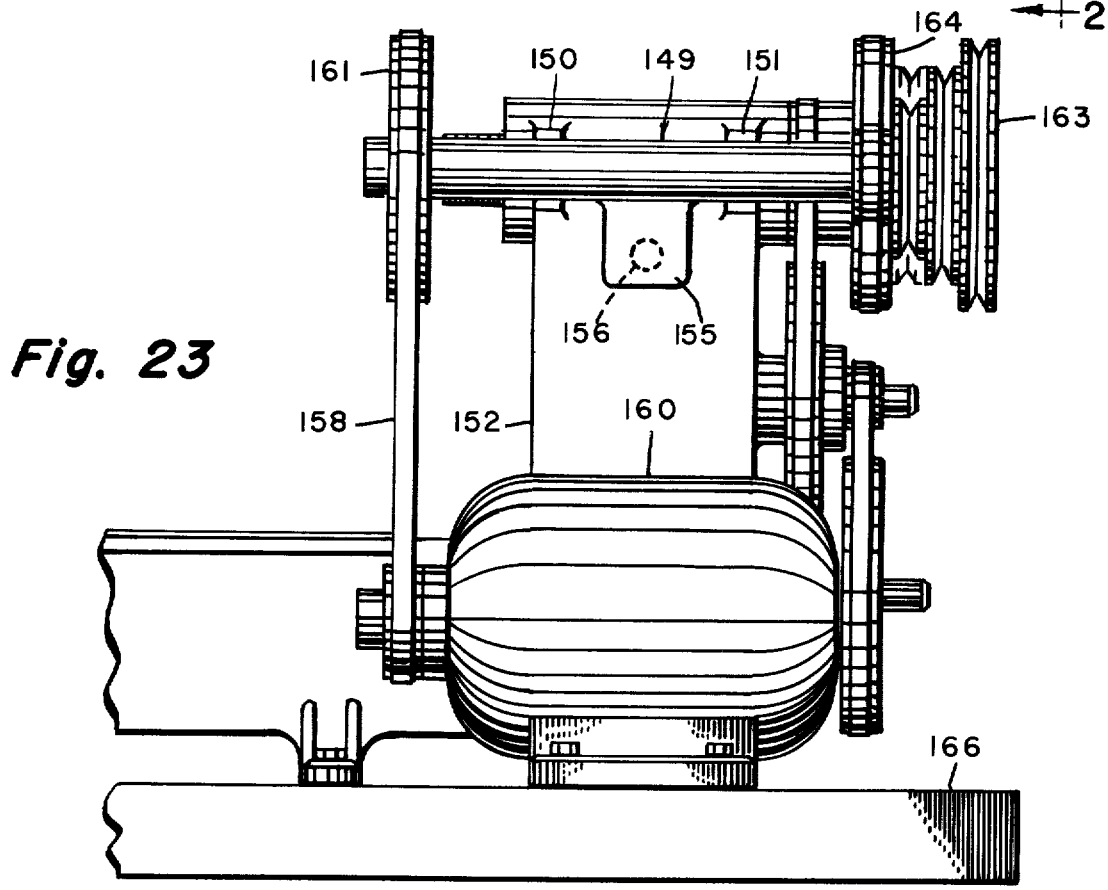
FIG. 23 is a rear view with respect to FIG. 22.
Figure 24:
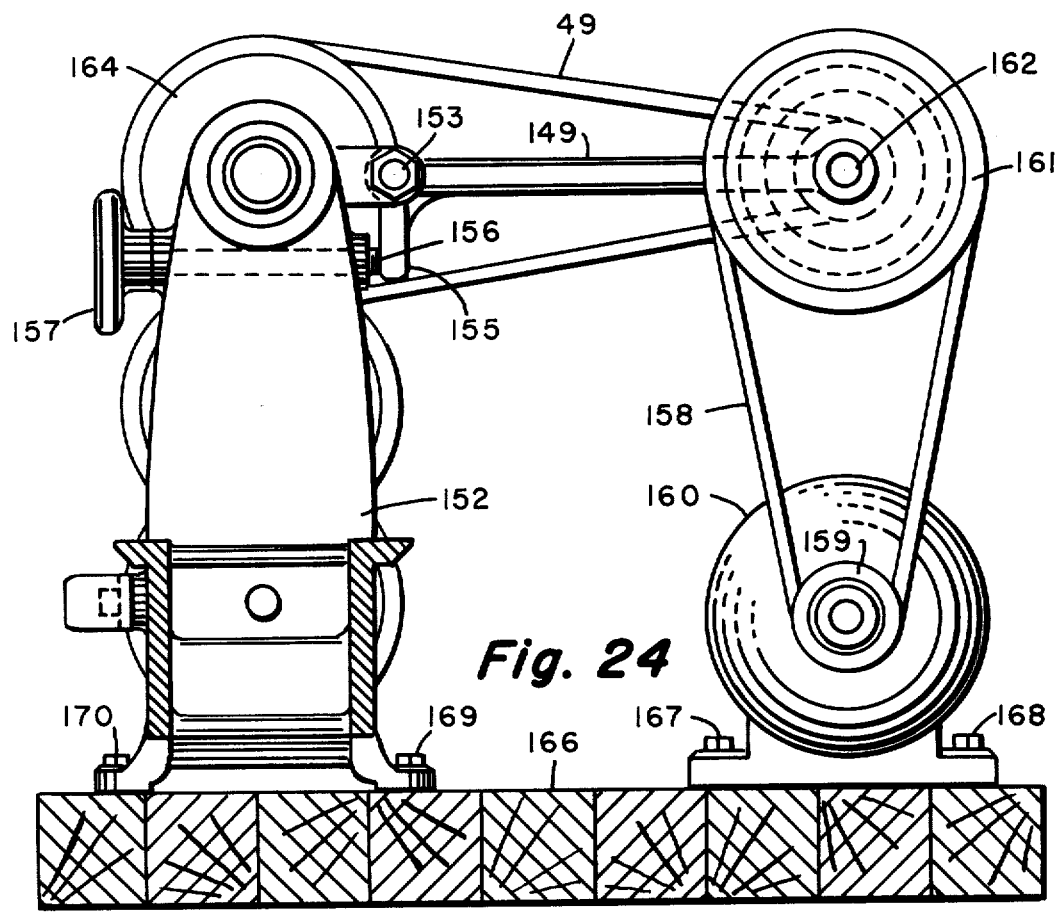
FIG. 24 is a section normal to the axis of rotation of the spindle, showing the structure appearing in FIGS. 21–23.
Figure 25:
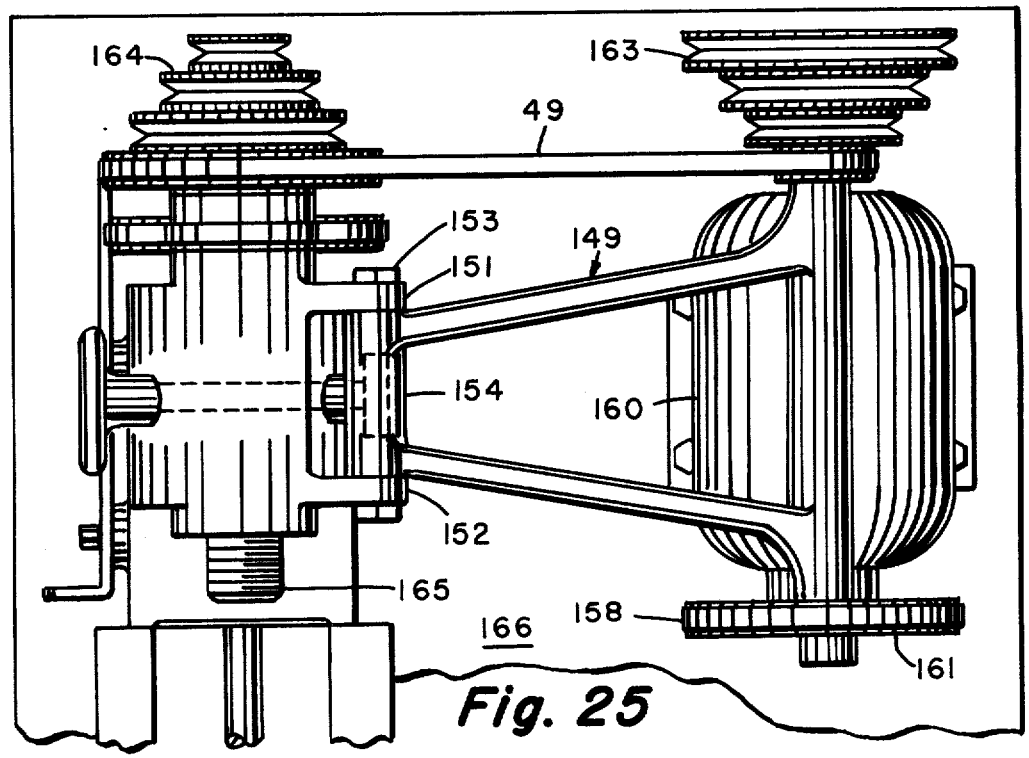
FIG. 25 is a plan view of the structure shown in FIG. 24.

The pedestal 119 at the left extremity of the frame 62, as viewed in FIG. 10, has a bearing section 120 provided with sleeve bearing inserts 121 and 122 (see FIG. 11) supporting the main spindle 123. A driving sheave 124 receives the belt 49 (refer to FIG. 9) from the powerhead sheave 47. A pair of oil holes as shown at 125 and 126 is used, so that one can function as a vent while oil is injected in the other. The arrangement illustrated in FIG. 11 provides a reservoir of oil between the adjacent ends of the bearing sleeves 121 and 122. A disengageable power take-off sheave 127 is carried by the spindle 123 in a freely rotatable fit. This sheave can be rotatably fixed with respect to the spindle by tightening the set screw 128. With this set screw loose, the sheave 127 is free to rotate with respect to the spindle 123, and will do so when any amount of drag is applied to it. A belt 129 engages both the sheave 127 and the other sheave 130 (refer to FIGS. 10 and 11). This latter sheave is fixed with respect to a tubular extension of the small idler sheave 131. The two idler sheaves rotate together as a unit freely about the cantilever idler shaft 132, which is preferably fixed with respect to the frame 62 by threaded engagement as shown at 133 in FIG. 11. The assembly of the two idler sheaves can be slipped on and off the idler shaft freely, and is maintained in position solely by the tension and placement of the belts 129 and 134, the latter being engaged with the feed screw sheave 135. This sheave is normally freely rotatable about the feed screw shaft portion indicated at 136. A clutch member 137 is essentially a collar fixed with respect to the shaft portion 136 by cross pin 138. This collar has a pair of axially-extending projections 139 and 140 disposed to interengage with corresponding recesses in the hub of the sheave 135. The clutch actuator 141 can be placed in either of two positions. These are shown, respectively, in FIGS. 10 and 16. The actuator 141 is carried by the screws 142 and 143 engaging the frame 62. These screws traverse the slots 144 and 145, respectively, with the slot 145 having offset portions establishing a locking action tending to prevent the actuator 141 from moving to the right or left. The actuator 141 also has a rearwardly-extending offset 146, the end of which engages the groove 147 in the sheave 135. This is a running fit at this point, with enough clearance to assure that there is no binding as a result of the slight rocking movement of the actuator 141 about the bolt 142 (as the right-hand portion is placed so that the bolt 143 engages one or the other of the offsets in the slot 145). The manipulation of the actuator 141 with the handle 148 will therefore engage or disengage the sheave 135 from the projections 139 and 140 of the clutch member.

As the clutch actuator is placed in the release position shown in FIG. 10, the belt 134 assumes the illustrated offset position. Within a few seconds, this is equalized between the belt 134 and the belt 129, accompanied by a slight axial shifting of the idler assembly to the left along the shaft 132. Enough offset from the belt system remains to establish a continuing tendency to move the feed screw sheave 135 again to the right, so that the belts are then in the aligned relative position shown in FIG. 16. This tendency produces a continuing pressure against the actuator 141 at the groove 147, and generating a degree of friction tending to rotate the actuator 141 in a counterclockwise direction, as viewed in FIG. 10. This is the reason for the presence of the offsets in the slot 145 at the lower extremity of the slots, so that any such forces would tend to hold the actuator solidly in the disengaged position. This feature is significant when it is desired to keep the clutch disengaged, so that the feed screw does not operate during milling operations, or when it is desired to operate the feed screw manually at the hand wheel 84. Under some design porportions, it is possible for the center of gravity at the actuator 141 to be sufficiently displaced to the right of the pivot screw 142 to create a tendency to disengage the release position of the clutch; and under these circumstances, it will be necessary either to counterbalance the actuator 141 by adding weight at the left end or provide a biasing action tending to maintain the position of the actuator shown in FIG. 10.

Referring to FIGS. 21 through 25, a bench-mounted version of the invention has an idler arm 149 pivotally secured at the lugs 150 and 151 of the modified pedestal 152. A pivot bolt 153 traverses these lugs and also the portion 154 of the idler arm 149. The downward extension 155 from the portion 154 bears against the end of the bolt 156 traversing the pedestal 152, and controlled by the handle 157. Rotating this handle to the position shown in FIG. 24 brings the bolt 156 against the downward extension 155 to induce a rotation of the idler arm 149 in a counter-clockwise direction to control the tension on the belt 158 extending from the sheave 159 of the motor 160 to the sheave 161 carried by the idler shaft 162 rotatably supported at the outer extremity of the idler arm 149. Speed control is obtained through the relationship of the step cone pulleys 163 and 164, respectively mounted on the idler shaft and on the spindle 165 of the lathe. Except for this bench-mounted drive system, the remainder of this lathe is the same as that previously described. Shifting of the belt 49 to the various positions possible by the sheaves 163 and 164 is accomplished by first back-rotating the handle 157 enough to permit clockwise rotation of the arm 149 to a sufficient degree to disengage the belt 158 from either or both of the sheaves 159 and 161. The arm 149 can then be swung counterclockwise about the pivot bolt 153 so that it is extending approximately upwardly. This movement will decrease the distance between the axes of the idler shaft 162 and the spindle 165, and will consequently extablish enough slack in the belt 49 to permit shifting it from one position to another on the sheaves 163 and 164. When the arm 149 is returned to the FIG. 24 position, a toggle-type action is generated establishing belt tension, while still permitting considerable vertical movement of the shaft 162 without substantially disturbing this tension. This relationship permits the handle 157 to establish the desired degree of control over the tension of the belt 158. Both the lathe assembly and the motor 160 can thus be secured to a convenient bench surface 166 without requiring a great deal of precision in the location of the mounting screws 167–170. As a by-product of this arrangement, the placement of the belt 49 is made much easier, and also more safe, by performing this operation in the upwardly-extended position of the idler arm 149. This eliminates the need to reach over the pedestal 152, and it should be noted that the belt 158 from the motor 160 is accessible to the right of the pedestal 152, consequently making it unnecessary to reach over the machine at this point also. To some degree, availble standard belt sizes can be accommodated by a compromise that will place the idler arm in as nearly to a horizontal position as possible. Specially matched belts are therefore rendered unnecessary without the necessity of resorting to complicated belt-tension adjustment mechanism.

I claim:

1. A lathe including a frame having a guideway, a carriage movably mounted on said guideway, a spindle rotatably mounted in said frame on an axis parallel to said guideway, and a feed screw rotatably mounted in said frame on an axis parallel to said guideway, wherein the improvement comprises:

bearing means disposed at opposite ends of said frame and carrying said feed screw;

an integral extension of said feed screw and said spindle extending beyond said frame at one of said frame ends, said feed screw being in threaded engagement with a portion of said carriage assembly between spaced parallel guideway sections;

a thrust-transfer member removably secured to the opposite end of said feed screw from said extension exteriorly of said frame, said member being in axial thrust-bearing relationship to the end of said frame remote from said extension, the arrangement being such that said feed screw may be assembled into said frame by insertion axially into said frame from said remote end of said frame in the absence of said member; and speed-reducing power-transfer means operatively associating said spindle and said feed screw extension.

2. A lathe as defined in claim 1, wherein said power transfer means includes sheave means carried respectively by said spindle and by said feed screw extension, said latter sheave means being receivable over the end of said extension, and also includes belt means engaging said sheave means.

3. A lathe as defined in claim 2, wherein said power transfer means includes a shaft interposed between said spindle and feed screw and parallel thereto, and also includes rotatively interlocked idler sheave means engaging said belt means.

4. A lathe as defined in claim 2, wherein said power-transfer means includes a collar secured to said feed screw extension, said collar and feed screw sheave means having axially-engageable clutch means, and also includes clutch-actuator means mounted on said frame.

5. A lathe as defined in claim 2, wherein said power-transfer means includes a cantilever shaft fixed with respect to said one frame end and projecting parallel to said spindle and extension in a position disposed therebetween, and also includes rotatively interlocked idler sheave means rotatably and axially received on said cantilever shaft, said feed screw sheave being axially received over the end of said feed screw extension.

6. A lathe as defined in claim 2, wherein said power-transfer means includes mean selectively adapted to rotatively engage and disengage said spindle from said spindle sheave.

* * * * *